(12) United States Patent
Aandewiel et al.

(10) Patent No.: US 8,062,105 B2
(45) Date of Patent: Nov. 22, 2011

(54) SCALDING APPARATUS FOR POULTRY

(75) Inventors: Leendert Aandewiel, Oostzaan (NL); Jacob Jan Van Craaikamp, Oostzaan (NL); Jacob Kiewiet, Oostzaan (NL); Pieter Willem Vonk, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 1038 days.

(21) Appl. No.: 11/600,598

(22) Filed: Nov. 16, 2006

(65) Prior Publication Data
US 2007/0141971 A1 Jun. 21, 2007

(30) Foreign Application Priority Data
Nov. 18, 2005 (NL) ........................... 1030458

(51) Int. Cl.
*A22B 5/08* (2006.01)
*A22C 21/00* (2006.01)
(52) U.S. Cl. .......................... 452/77; 452/74
(58) Field of Classification Search ............... 452/74–81
See application file for complete search history.

(56) References Cited

U.S. PATENT DOCUMENTS

| | | | | |
|---|---|---|---|---|
| 1,338,452 A | 4/1920 | Hunsinger, Sr. | | |
| 1,760,392 A | 10/1927 | Arminger | | |
| 2,015,058 A | * | 9/1935 | Bruce | 452/80 |
| 2,068,137 A | | 1/1937 | Jaeger | |
| 2,549,070 A | * | 4/1951 | Drews | 452/77 |
| 2,727,273 A | * | 12/1955 | Long | 452/77 |
| 2,866,998 A | * | 1/1959 | Turner | 452/80 |
| 3,074,103 A | * | 1/1963 | Roth et al. | 452/77 |
| 3,119,145 A | * | 1/1964 | Weprin | 452/76 |
| 3,343,477 A | * | 9/1967 | Ekstam | 99/347 |
| 4,309,795 A | * | 1/1982 | Simonsen | 452/76 |
| 4,566,151 A | * | 1/1986 | Warren | 452/80 |
| 4,852,215 A | * | 8/1989 | Covell, III | 452/79 |
| 4,868,950 A | * | 9/1989 | Harben, Jr. | 452/77 |
| 4,944,068 A | | 7/1990 | Covell, III | |
| 4,947,518 A | * | 8/1990 | Covell, III | 452/79 |
| 4,961,248 A | | 10/1990 | Criscione, II et al. | |
| 4,996,741 A | * | 3/1991 | Covell, III | 452/74 |
| 5,015,213 A | | 5/1991 | Hazenbroek | |
| 5,019,013 A | | 5/1991 | Hazenbroek | |
| 5,232,394 A | * | 8/1993 | Covell et al. | 452/78 |
| 5,273,485 A | | 12/1993 | Hegelmann et al. | |

(Continued)

FOREIGN PATENT DOCUMENTS
EP 0551123 * 7/1993

OTHER PUBLICATIONS
Netherlands Patent Office Search Report, Nov. 18, 2005.

*Primary Examiner* — David Parsley
(74) *Attorney, Agent, or Firm* — Dority & Manning, P.A.

(57) ABSTRACT

A scalding apparatus for poultry includes an overhead conveyor for moving poultry, suspended by their legs, through an immersion tank filled with scald water. A filtering device and pumping unit can be used to withdraw the scald water, clean the scald water, and reintroduce the scald water to the tank. Upwardly directed nozzles, located in the bottom of the tank, provided a stream of scald water directed up and over the poultry. A reversing guide may be provided for redirecting the scald water downwards to the poultry. The immersion tank may be divided into chambers.

12 Claims, 6 Drawing Sheets

U.S. PATENT DOCUMENTS

| | | |
|---|---|---|
| 5,302,149 A | 4/1994 | Witham et al. |
| 5,326,308 A * | 7/1994 | Norrie .............................. 452/80 |
| 5,484,332 A * | 1/1996 | Leech et al. .................. 452/173 |
| 5,733,184 A | 3/1998 | Curry et al. |
| 5,882,253 A * | 3/1999 | Mostoller ..................... 452/173 |
| 5,976,005 A * | 11/1999 | Wilson et al. ................. 452/173 |
| 6,142,861 A * | 11/2000 | Buhot et al. .................... 452/78 |
| 7,070,493 B2 | 7/2006 | Hazenbroek et al. |

* cited by examiner

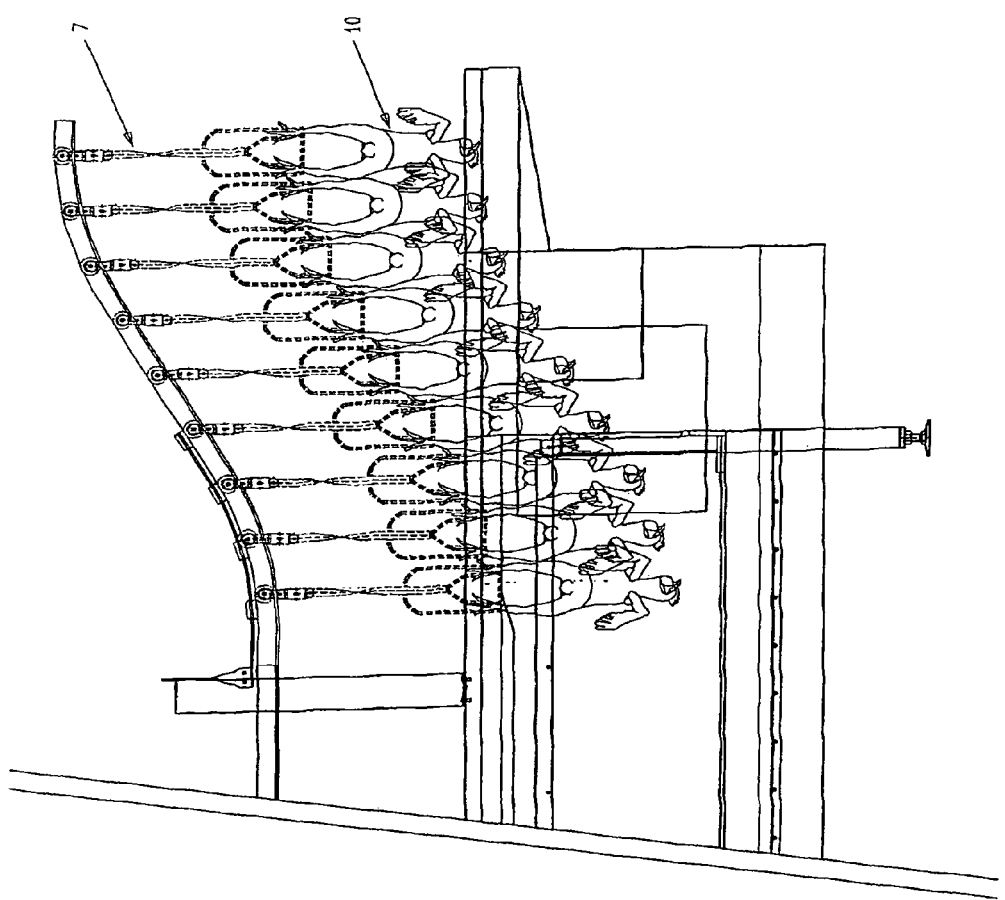

SCALDING APPARATUS FOR POULTRY

TECHNICAL FIELD OF THE INVENTION

The invention relates to a scalding apparatus for poultry that moves poultry, suspended by their legs, through an immersion tank filled with scald water for scalding the poultry.

BACKGROUND OF THE INVENTION

A scalding apparatus is known from U.S. Pat. No. 4,944,068. In this known scalding apparatus, the poultry is conveyed through an immersion tank comprising a number of adjacent passage chambers. At the bottom side of these chambers the scald water is withdrawn, treated, and subsequently reintroduced into inlet chambers that are divided from the passage chambers. These inlet chambers are divided from the passage chambers by means of a baffle. By overflowing this baffle, treated scald water is reintroduced to reach again the chambers through which the poultry passes. If necessary the reintroduced scald water supplemented with water in order to compensate for evaporation and removal of scald water from the scalding apparatus by the poultry leaving the apparatus.

THE SUMMARY OF THE INVENTION

A scalding apparatus according to an exemplary embodiment of the invention includes an immersion tank that is provided at the bottom with upwardly directed nozzles for generating, in at least one passage chamber for the poultry, a vertically upward directed stream of scald water over the poultry. At the top side, the immersion tank is provided with a reversing guide for directing the stream of scald water downwards at the poultry.

The nozzles are of the venturi type so that a relatively minor efflux of scald water from the nozzles produces a relatively strong, turbulent flow of scald water in the immersion tank. This is favourable for an effective heat transfer to the skin of the poultry and for a homogeneous temperature distribution of the scald water in the immersion tank. Another advantage arising from this is that there are no air inclusions among the feathers of the poultry and that no frothing of the scald water occurs.

In a further embodiment of the invention, the scalding apparatus includes upwards directed nozzles provided with an outflow-direction component in the transport direction of the overhead conveyor. The flow of scald water in the immersion tank moves in the same direction as the poultry suspended from the overhead conveyor on its path through the immersion tank. This is particularly advantageous if the overhead conveyor has a high line speed of up to, for example, approximately 15,000 chickens per hour. At such line speeds the usually applied counterflow increases a drag effect of the poultry, so that they tend to come up in the scald water. As just mentioned, however, the scald water flows in the same direction so that this effect, which is already suppressed due to the stream of scald water being directed downwards towards the poultry, is counteracted further. To enhance the efficacy of going with the stream as mentioned above, the body axis of the nozzles forms an angle in relation to the vertical of approximately 0-30°, preferably approximately 15-25°.

The scalding apparatus according to exemplary embodiments of the invention is suitably embodied such that the upwards directed nozzles are disposed next to a guide wall delimiting the passage chamber, and the reversing guide is provided at the top side of the guide wall.

In order to further suppress air inclusions in the circulating scald water, the reversing guide is preferably positioned completely below the scald water surface.

In still another embodiment of the invention, the scalding apparatus has a guide wall that operates as a heat exchanger. This facilitates a fast and accurate temperature management in the immersion tank, wherein the temperature of the scald water may vary between 48 and 60° C., and renders it possible to limit the temperature variation in the immersion tank to 0.2° C.

In another exemplary embodiment of the invention, a filtering device is provided on its bottom side with an inlet for scald water from the immersion tank. The scald water can thus be withdrawn along the bottom of the immersion tank, outside the range of the partly vertical turbulent flow of the scald water. The said water can be subsequently treated outside of the immersion tank by pasteurising, heating, adding supplemental water, and mixing, before being reintroduced.

In certain embodiments, it is also advantageous for the nozzles to be disposed on a tunnel provided on the floor of the immersion tank, which houses feed pipes connected with the pumping unit, for the supply of scald water to the nozzles.

The construction of the scalding apparatus according to embodiments of the invention is very simply finished so that it is very easy to clean for the purpose of the required daily disinfection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 6 a detailed depiction of the scalding apparatus according to an exemplary embodiment of the invention viewed from the side, showing the travel path of the overhead conveyor and the entrance casu quo exit of the immersion tank.

Identical reference numerals in the figures refer to similar components.

DETAILED DESCRIPTION OF EMBODIMENTS OF THE INVENTION

Figure 1:
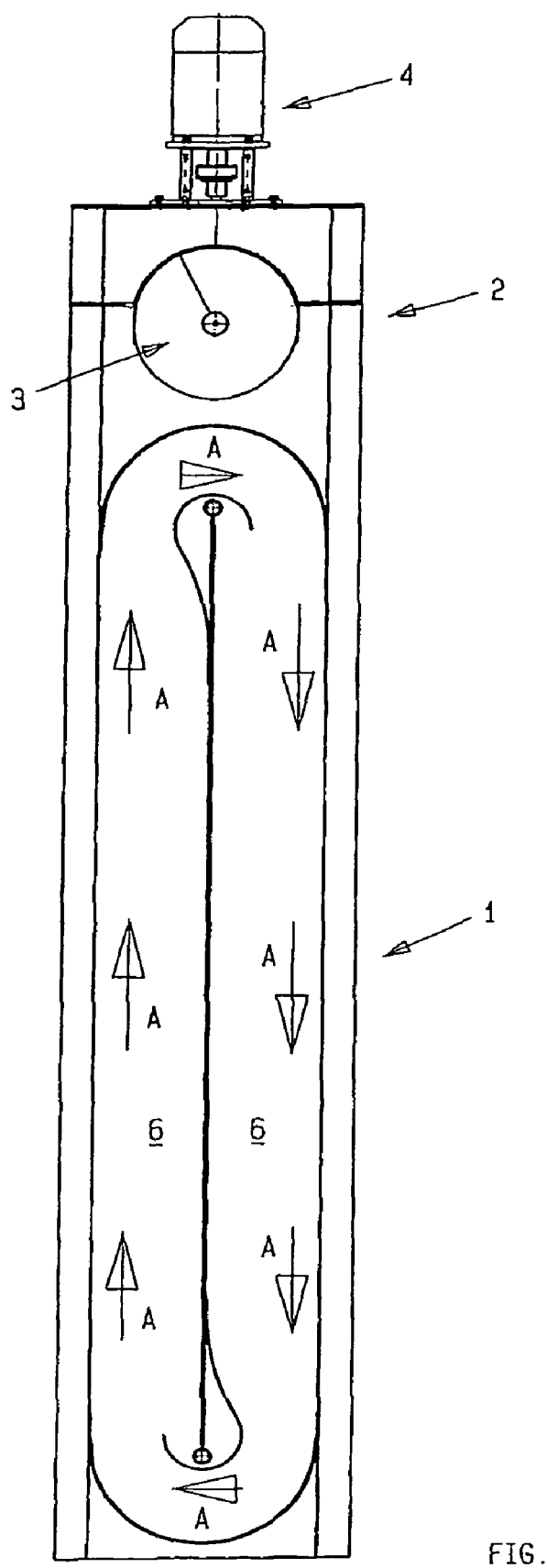
FIG. 1 a top view of a preferred embodiment of an immersion tank of a scalding apparatus according to an exemplary embodiment of the present invention.

Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Referring to FIG. 1, a top view is shown of an immersion tank 1 for scalding poultry Arrows A indicate the flow direction of the scald water in an immersion tank 1. At the front side 2 of the immersion tank 1, a filtering device 3 is provided and a pumping unit 4 for withdrawing circulating scald water from the immersion tank 1, cleaning the scald water, and reintroducing it into the immersion tank 1.

Figure 2:
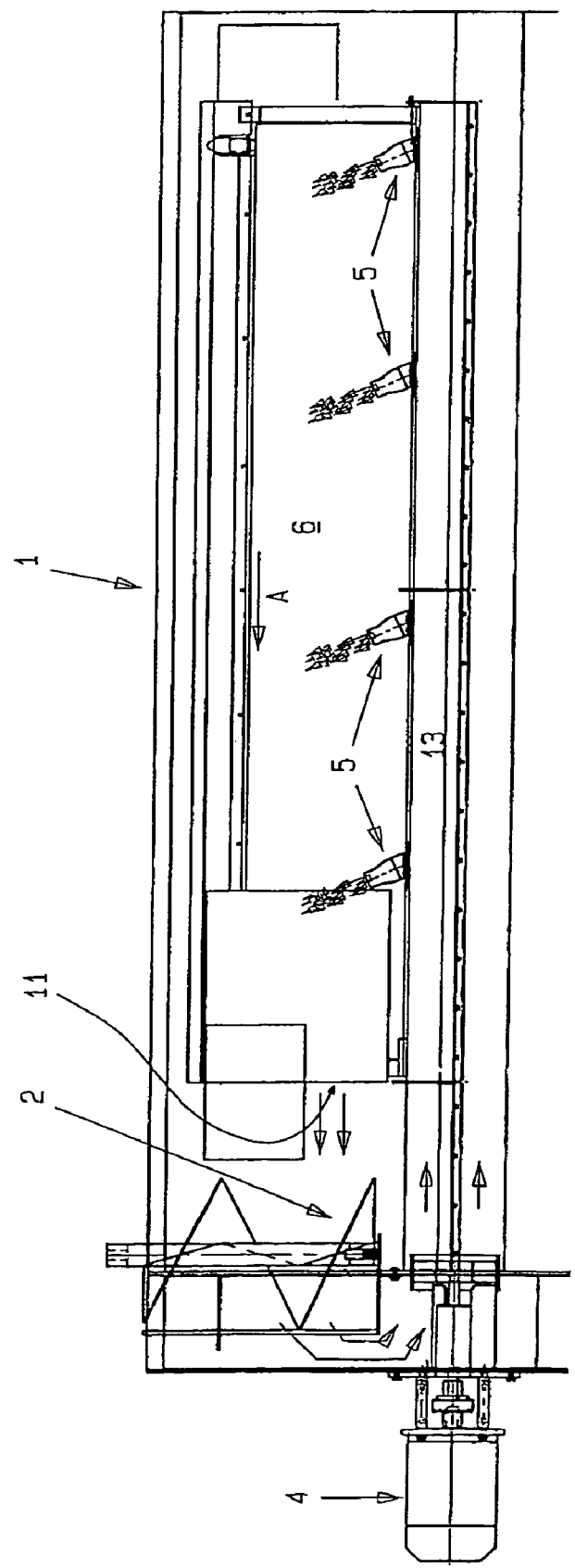
FIG. 2 a longitudinal section of a side view of the immersion tank of FIG. 1.

FIG. 2 shows that at the bottom side, the immersion tank 1 is provided with upwards and obliquely forward directed nozzles 5 for producing the circulating stream of scald water in the immersion tank 1 as symbolised by the arrows A in FIG. 1. The circulating stream occurs in the passage chambers 6 for the poultry and is obtained due to the fact that, as clearly shown in FIG. 2, the upwardly directed nozzles 5 are also provided with a forwardly directed outflow component as indicated in FIG. 2 with arrow A. This direction of outflow component coincides with the transport direction of the overhead conveyor 7 shown in FIG. 3. The direction of conveyance of this overhead conveyor 7 is indicated with arrow B in FIG. 3.

Figure 3:
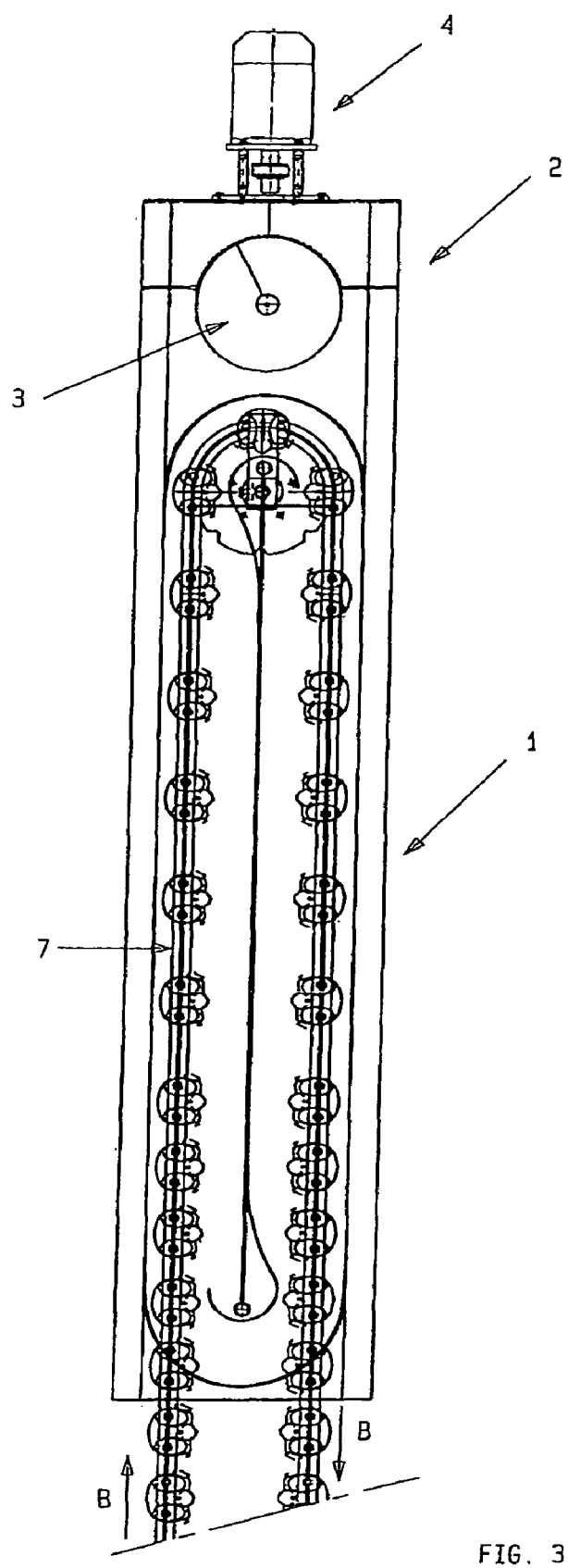
FIG. 3 a scalding apparatus according to an exemplary embodiment of the invention including of the immersion tank shown in FIG. 1 with an overhead conveyor for the poultry to be scalded in the immersion tank.
Figure 4:
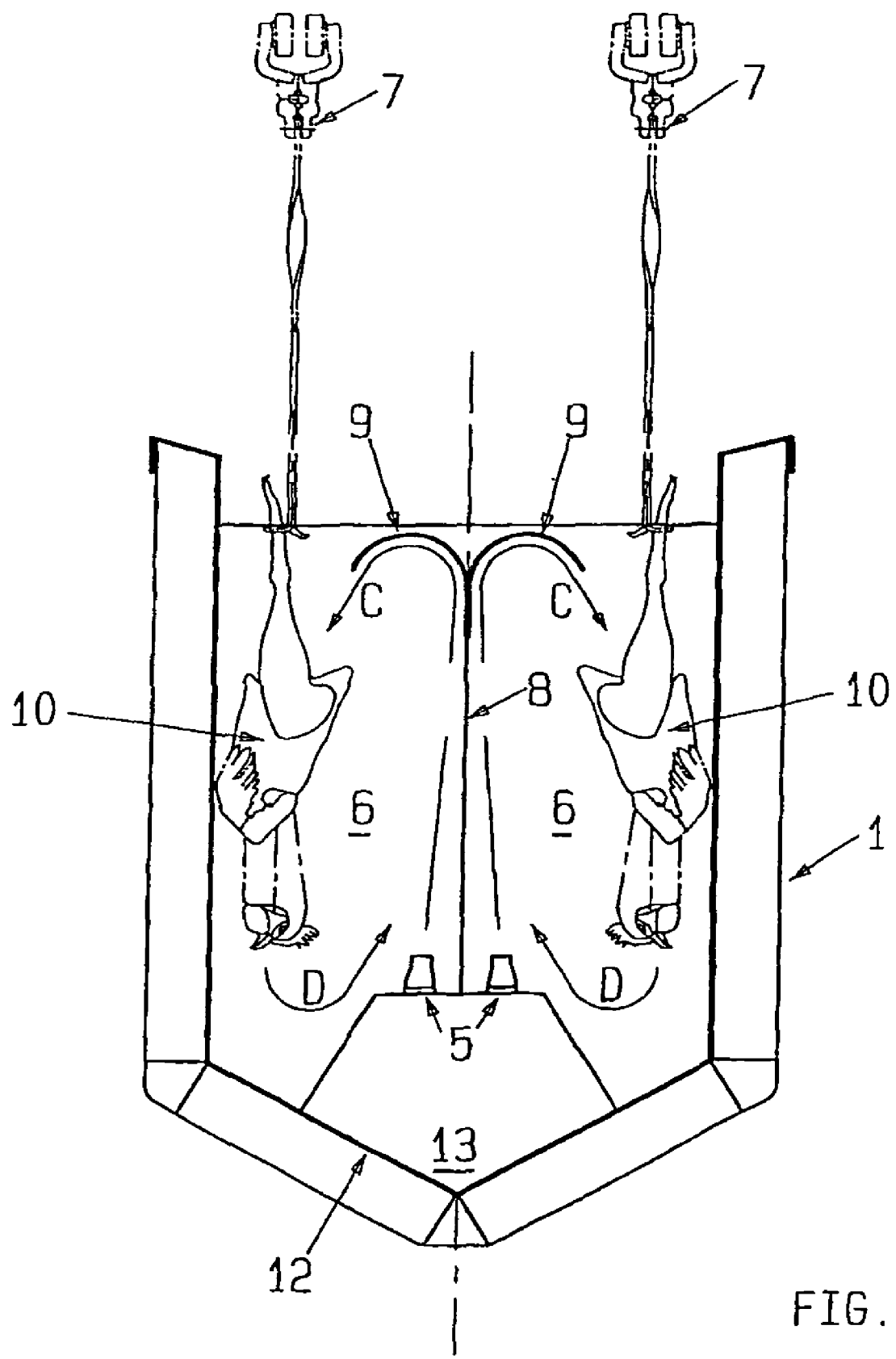
FIG. 4 a cross section of the scalding apparatus shown in FIG. 3.

It will be clear that due to the nozzles 5 (see FIG. 2) being directed upward, they generate a stream of scald water in the passage chambers 6 that is directed upwards over the poultry 10, as can be clearly seen in FIG. 4. FIG. 4 shows in a cross sectional view of FIG. 3 that the nozzles 5 are directed upwards and are disposed at the bottom side of the immersion tank 1 next to the guide wall 8 delimiting the passage chambers 6. At its top side, the guide wall 8 is provided with a reversing guide 9 for the purpose of directing the stream of scald water downwards at the poultry 10 suspended from the overhead conveyor 7. The reversing guide 9 is located completely below the scald water surface. The circulation stream generated by the relatively moderate efflux from the nozzles 5 in the passage chambers 6 is symbolised by the arrows C and D.

The guide wall 8 may optionally be embodied as a heat exchanger for enhancing the fast and even temperature control of the scald water in the passage chambers 6 of the immersion tank 1.

Figure 5:
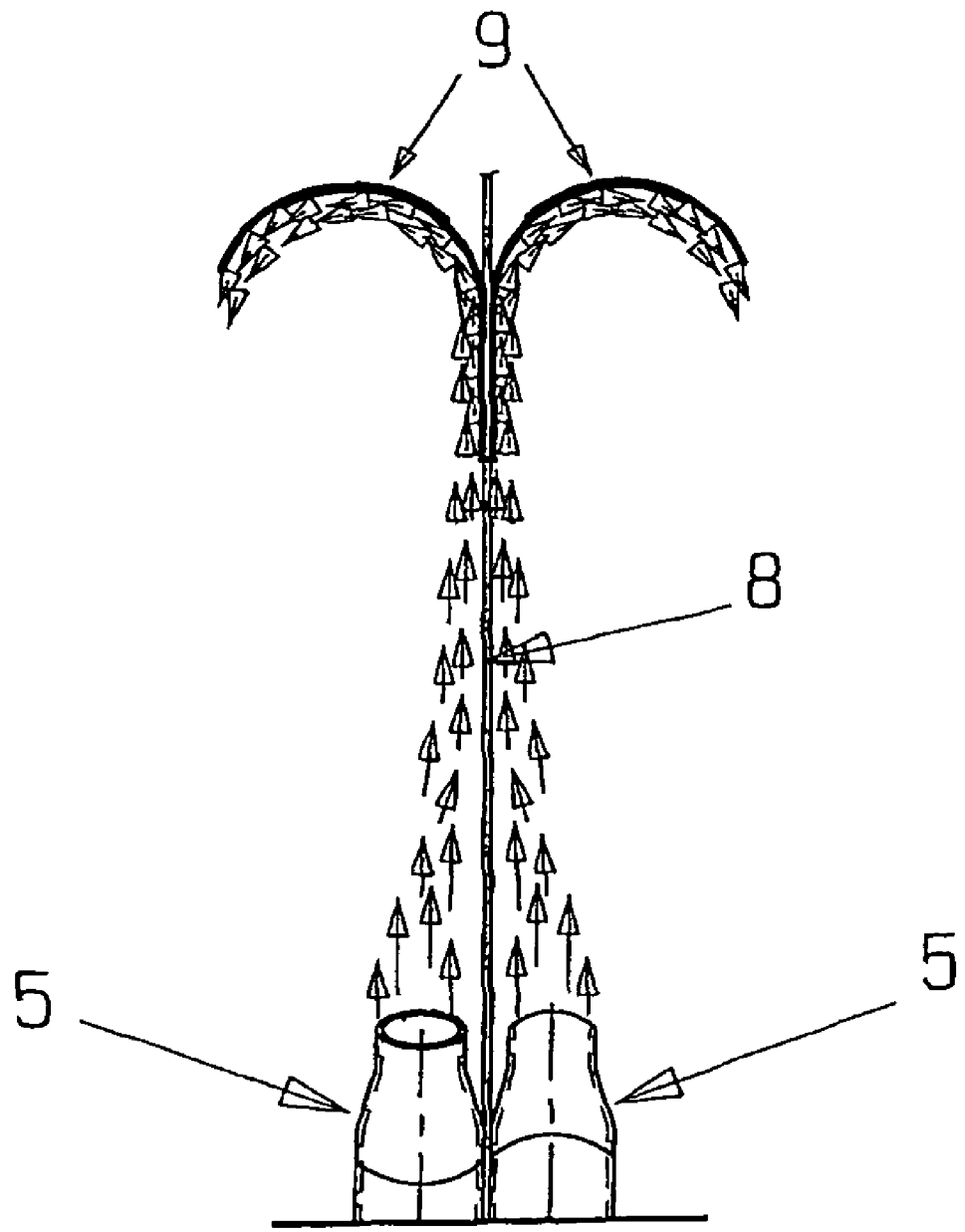
FIG. 5 is a detailed depiction of the nozzles of the immersion tank disposed next to the guide wall.

FIG. 5 shows in more detail the course of the flow of the scald water from the nozzles 5 along the guide wall 8 and the reversing guide 9.

With reference again to FIG. 2, it is shown that the filtering device 2 is at its bottom side provided with an inlet 11 for scald water from the immersion tank 1 so that at this point the scald water can be withdrawn without interfering with the vertical, turbulent flow over the poultry.

The pumping unit 4 ensures that after possible further treatment by pasteurisation, addition of supplemental water, heating and mixing, the filtered scald water is supplied via feed pipes (not shown), which are accommodated in a tunnel 13 provided on the floor of the immersion tank 12. The filtered scald water is supplied to the nozzles 5 for the reintroduction of the scald water into the passage chambers 6 of the immersion tank 1.

FIG. 3 further shows that at one end of the Figure (away from pumping unit 4), there is less space between the poultry than shown elsewhere. This part of the figure relates to the entrance exit where poultry is introduced into the immersion tank 1 or removed therefrom, respectively. At this entrance/exit, the course of the overhead conveyor 7, the poultry is at this entrance/exit lifted to the proper height to enable it to enter or leave the immersion tank 1.

It will be appreciated by those skilled in the art that various modifications and variations can be made in the present invention without departing from the scope of the invention. It is intended that the present invention include such modifications and variations as come within the scope of the appended claims and their equivalents.

The invention claimed is:

1. A scalding apparatus for poultry, comprising:
   an immersion tank for holding scald water used to scald the poultry, the immersion tank having a bottom, top, a longitudinal direction, and a vertical direction that is perpendicular to the longitudinal direction;
   a filtering device connected to the immersion tank and configured for removing unwanted materials from the scald water;
   a conveyer positioned over the immersion tank and configured for transporting the poultry through the immersion tank along the longitudinal direction;
   a reversing guide located proximate the top of said immersion tank and configured for redirecting a flow of scald water towards the bottom of said immersion tank;
   a plurality of nozzles located proximate to the bottom of said immersion tank and obliquely oriented with respect to the vertical direction so as to create the flow of scald water directly against said reversing guide while simultaneously generating a circulation of scald water about said immersion tank along the longitudinal direction and coinciding with the direction said conveyor is transporting the poultry; and
   a pumping unit connected with said immersion tank and having an inlet for the receipt of scald water from said immersion tank and an outlet for supplying scald water to said plurality of nozzles.

2. A scalding apparatus for poultry as in claim 1, wherein said conveyor defines a conveyor path and said plurality of nozzles are positioned as to cause the scald water to move generally along the same direction as the conveyor path.

3. A scalding apparatus for poultry as in claim 1, wherein said plurality of nozzles each have a body defining an axis of water flow, and wherein said axis form an angle relative to the vertical direction that is in a range of about 0 degrees to about 30 degrees.

4. A scalding apparatus for poultry as in claim 1, wherein said plurality of nozzles each have a body defining an axis of water flow, and wherein said axis form an angle relative to the vertical direction that is in a range of about 15 degrees to about 25 degrees.

5. A scalding apparatus for poultry as in claim 1, further comprising a guide wall positioned so as to divide said immersion tank into passage chambers.

6. A scalding apparatus for poultry as in claim 5, wherein said reversing guide is supported by said guide wall.

7. A scalding apparatus for poultry as in claim 6, wherein said reversing guide is positioned so as to be completely under scald water when said immersion tank is filled.

8. A scalding apparatus for poultry as in claim 7, wherein said guide wall comprises a heat exchanger.

9. A scalding apparatus for poultry as in claim 5, wherein said guide wall comprises a heat exchanger.

10. A scalding apparatus for poultry as in claim 1, wherein said filtering device further comprises a filtering device inlet in fluid communication with said immersion tank for receipt of scald water.

11. A scalding apparatus for poultry as in claim 1, wherein said conveyor is configured for both lowering the poultry into scald water in said immersion tank and raising the poultry from scald water in the said immersion tank.

12. An apparatus for scalding poultry, comprising:
- an immersion tank for containing scald water, said immersion tank defining a top and bottom and also defining vertical and longitudinal directions, the vertical direction being perpendicular to the longitudinal direction;
- a dividing wall located within said tank and comprising two sides;
- a reversing guide positioned about the top of said dividing wall;
- a transport mechanism position proximate the immersion tank and configured for delivering poultry into the immersion tank;
- a plurality of nozzles located about the bottom of said immersion tank and positioned along both of said two sides of said dividing wall, said nozzles being oriented to direct a flow of scald water towards said reversing guide and to create a circulation of the scald water along the longitudinal direction of said immersion tank and along the same direction the poultry is moved by said transport mechanism about said immersion tank; and
- a pumping unit in fluid communication with said plurality of nozzles and said immersion tank.

* * * * *